United States Patent
Rai (10) Patent No.: US 8,059,641 B1
(45) Date of Patent: Nov. 15, 2011

(54) ENCAPSULATION METHOD DISCOVERY PROTOCOL FOR NETWORK ADDRESS TRANSLATION GATEWAY TRAVERSAL

(75) Inventor: Anupam Rai, Milpitas, CA (US)

(73) Assignee: Avaya Inc., Basking Ridge, NJ (US)

( * ) Notice: Subject to any disclaimer, the term of this patent is extended or adjusted under 35 U.S.C. 154(b) by 1237 days.

(21) Appl. No.: 11/458,824

(22) Filed: Jul. 20, 2006

(51) Int. Cl.
- H04L 12/28 (2006.01)
- H04L 12/56 (2006.01)
- G06F 15/16 (2006.01)
- G06F 15/173 (2006.01)
- H04M 1/64 (2006.01)

(52) U.S. Cl. .............. 370/389; 370/395.5; 379/88.17; 709/236; 709/238

(58) Field of Classification Search .............. None
See application file for complete search history.

(56) References Cited

U.S. PATENT DOCUMENTS

| | | | | |
|---|---|---|---|---|
| 6,243,758 B1* | 6/2001 | Okanoue | | 709/238 |
| 6,321,264 B1* | 11/2001 | Fletcher et al. | | 709/224 |
| 6,594,261 B1* | 7/2003 | Boura et al. | | 370/389 |
| 6,731,625 B1 | 5/2004 | Easep et al. | | |
| 7,032,242 B1* | 4/2006 | Grabelsky et al. | | 726/11 |
| 7,305,481 B2* | 12/2007 | Blanchet et al. | | 709/230 |
| 7,346,926 B2* | 3/2008 | Vaarala et al. | | 726/14 |
| 7,423,995 B1* | 9/2008 | Elliott et al. | | 370/332 |
| 2002/0046348 A1* | 4/2002 | Brustoloni | | 713/201 |
| 2002/0053031 A1* | 5/2002 | Bendinelli et al. | | 713/201 |
| 2004/0081172 A1* | 4/2004 | Ould-Brahim | | 370/395.53 |
| 2007/0110063 A1* | 5/2007 | Tang et al. | | 370/390 |
| 2008/0168181 A1* | 7/2008 | Berkvens et al. | | 709/245 |

FOREIGN PATENT DOCUMENTS

WO 9847298 10/1998

OTHER PUBLICATIONS

"Network address translation"; from Wikipedia, the free encyclopedia; http://en.wikipedia.org/wiki/Network_address_translation; printed Apr. 18, 2006; 5 pages.
"NAT Network Address Translation explained at HomeNetHelp.com"; http://www.homenethelp.com/web/explain/about-NAT.asp; printed Apr. 18, 2006; 9 pages.
"Network Address Translation"; http://www.vicomsoft.com/knowledge/reference/nat.html; printed Apr. 18, 2006; 10 pages.
PF: NEtwork Address Translation (NAT); http://www.openbsd.org/faq/pf/nat.html; printed Apr. 18, 2006; 8 pages.

* cited by examiner

Primary Examiner — Xavier Szewai Wong
(74) Attorney, Agent, or Firm — Sheridan Ross P.C.

(57) ABSTRACT

The present invention is directed to a communication device including a discovery agent 348 operable to determine an encapsulation method used by a tunnel by transmitting packets generated using different encapsulation protocols until a responsive packet is received on a selected receive port.

22 Claims, 5 Drawing Sheets

| Case | Security Gateway Supports UDP Encapsulated IPSEC with non-IKE Markers | Security Gateway Supports UDP Encapsulated IPSEC with non-ESP Marker | NAT Device is IPSEC Aware |
| --- | --- | --- | --- |
| 1 | Yes | No | Yes |
| 2 | Yes | No | No |
| 3 | Yes | Yes | Yes |
| 4 | Yes | Yes | No |
| 5 | No | No | Yes |
| 6 | No | No | No |

| Byte 1 | Byte 2 | Byte 3 | Byte 4 |
|---|---|---|---|
| 16 Bytes of IP header containing Version. Header Length, Payload Length Fragment Identifier, Type of Service, Etc ||||
| Source IP Address = IP Secured Comm. Client's Virtual IP Address ||||
| Destination IP Address = IP Secured Comm. Client's Virtual IP Address ||||
| Source Port = A Randomly Generated Number Between 60000 and 65535 || Destination Port = Source Port ||
| Length || Checksum = 0 ||
| 32 Bit Sequence Number. Starts From 1 and is Incremented by 1 Each Time a New Packet is Sent ||||
| 32 Bit Time Stamp ||||
| 192 Octets of Randomly Generated Data ||||

*Fig. 6*

ENCAPSULATION METHOD DISCOVERY PROTOCOL FOR NETWORK ADDRESS TRANSLATION GATEWAY TRAVERSAL

FIELD OF THE INVENTION

The invention relates generally to secured communications and particularly to secured voice communications.

BACKGROUND OF THE INVENTION

Virtual Private Networks or VPNs are rapidly growing in popularity. In a VPN, a shared network is augmented on a secure basis through encryption or tunneling. "Tunneling" refers to a process of encapsulating an encrypted data packet in an Internet Protocol or IP packet or frame relay frames for secure transmission across an inherently insecure, or untrusted, network, such as the Internet, an intranet, and a frame relay network. The leading tunneling protocols are currently IP Security (IPSec), Layer 2 Tunneling Protocol (L2TP), Point-to-Point Tunneling Protocol (PPTP), and SOCKSv.5. In a typical VPN application, a telecommuter dials into an Internet Service Provider or ISP. The ISP's router recognizes the request for a high-priority, secure tunnel from a remote secured communications client across the Internet to a corporate security gateway router to permit remote access of the corporate intranet. The tunnel would be set up through all the intermediate routers, effectively weaving its way through other, lower-priority Internet traffic. Additional security is frequently provided by a firewall positioned between the telecommuter's communication device and the Internet.

A firewall is a combination of hardware and software that limits the exposure of a computer or group of computers to an attack from outside. There are several types of firewalls, namely packet filter, circuit gateway, application gateway, or trusted gateway. A network-level firewall, or packet firewall, examines traffic at the network protocol packet level. An application-level gateway examines traffic at the application level, e.g., FTP, E-mail, or Telenet, and readdresses outgoing traffic so it appears to have originated from the gateway rather than from the internal host. As will be appreciated, a "host" refers to any computational component on a network, whether or not its primary purpose is to provide resources via the network. This type of firewall is known as a Network Address Translation or NAT firewall.

A NAT firewall or gateway allows an enterprise local area network to use one set of IP addresses for internal traffic and a second set of addresses for external traffic. There are two types of NAT. First, Network. Address Port Translation or NAPT refers to network address translation involving the mapping of port numbers (e.g., the source port number is replaced with a randomly chosen, unused port number of the gateway), which can allow multiple internal addresses to be mapped to a single IP address (known as an "overloaded" NAT). NAT with port-translation has two sub-types, namely source address translation (source NAT) (which rewrites the IP address of the internal device which initiated the connection) and destination address translation (destination NAT). Second, basic NAT or static NAT performs address translation but not port mapping.

Under any of the above types of NAT when packets pass through the NAT gateway, they are modified to shield the IP address of the internal device from the Internet host. The NAT gateway records its packet header changes in a state table. Neither internal devices nor the Internet host to a session is aware of the session packet header changes. When the Internet host replies to an internal device's packets, the response packets are addressed to the NAT gateway's external IP address at the translation port. The NAT gateway searches the state table to determine if the response packets match an already established connection. The match is based on the TCP or UDP client port numbers in the case of overloaded NAT or IP address and port number when multiple public addresses are available. Based on the match, the NAT gateway then makes the opposite changes to the response packets and forwards them to the internal device.

NAT can introduce complications in communication between hosts. Hosts behind a NAT gateway do not have true end-to-end connectivity and cannot participate in some Internet protocols. Services that require the initiation of TCP connections from the outside the network, or stateless protocols such as those using UDP, can be disrupted. Unless the NAT gateway makes a specific effort to support such protocols, incoming packets cannot reach their destination. Use of NAT further complicates security protocols, such as IPSec.

By way of illustration, NAT gateways use different methods of encapsulating IP telephony data in encrypted packets that pass over a Small Office Home Office or SOHO gateway. The end user of a VPN telecommunications device must know the particular encapsulation method to configure properly the VPN device so that it presents properly the packets to the gateway. If the user does not know which encapsulation methods are being used, the user is required to configure exhaustively all possible combinations to find the method being used.

SUMMARY OF THE INVENTION

These and other needs are addressed by the various embodiments and configurations of the present invention. The present invention is directed generally to automatic discovery of one or more selected tunnel parameters.

In a first embodiment of the present invention, a method is provided that includes the steps of:

(a) selecting a first encapsulation method;

(b) transmitting a packet encapsulated by the first encapsulation method on a selected transmit port;

(c) determining, from a receive packet counter associated with a selected receive port, whether the packet or a response to the packet has been received; and (d) when the packet or response has not been received within a selected period of time, selecting a second encapsulation method; and (e) repeating steps (b) and (c) using the second encapsulation method.

In a second embodiment, a method is provided that includes the steps:

(a) periodically introducing a packet into the tunnel at a selected frequency for a predetermined time, the source and destination ports in a packet header of the packet commonly being set to a randomly generated number, the packet being sourced from and destined to a secured communication client of a voice communication device, and the packet including a timestamp;

(b) when the packet is received by the secured communication client, determining a round trip time of the packet and/or a number of packets lost; and (c) when the round trip time and/or number of packets lost is not acceptable for voice communications, tearing down the tunnel.

The present invention can provide a number of advantages depending on the particular configuration. It can readily, quickly, and automatically ascertain the encapsulation method and transmit and receive ports used for both duplexed channels of a tunnel while using relatively lightweight packets. This prevents undue interference with network traffic and conserves bandwidth in the enterprise network. It can work with multiple vendors' gateways.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 3:
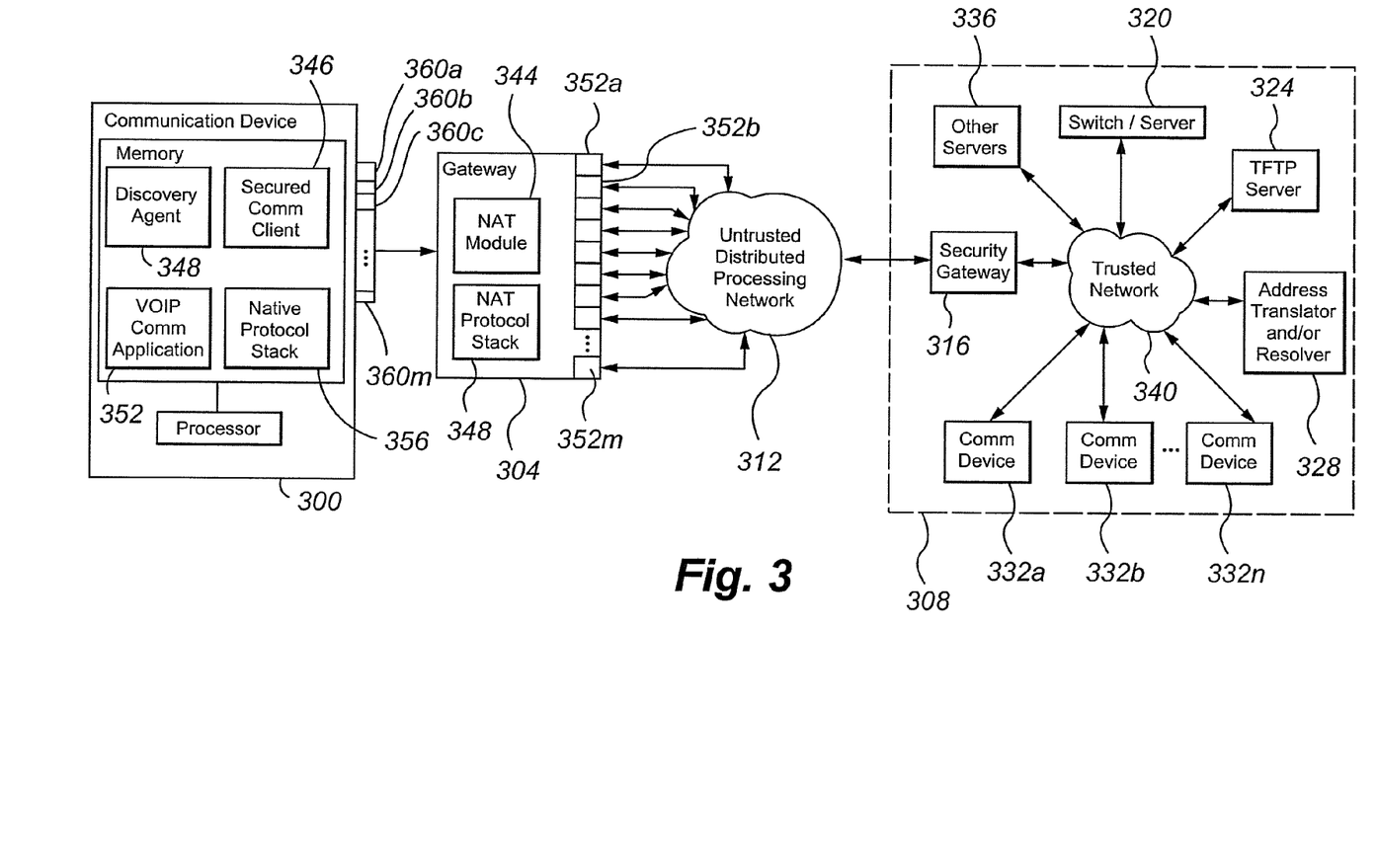
FIG. 3 shows a virtual private network configuration according to an embodiment of the present invention.

FIG. 3 depicts a VPN architecture according to a first embodiment of the present invention. The VPN architecture includes a communication device 300, a NAT gateway 304, and an enterprise network 308, interconnected with the NAT gateway 304 by an untrusted distributed processing network 312. The enterprise network 312 includes a security gateway 316, a voice communications switch/server 320, a Trivial File Transfer Protocol (TFTP) server 324, an address translator and/or resolver 328, a plurality of voice communication devices 332a-n, and other servers 336, all interconnected by a trusted (local area) network 340.

The communication devices 300 and 332a-n are preferably packet-switched devices, such as Voice over IP (VoIP) hardphones hardphones (e.g., Avaya Inc.'s 4600 Series IP Phones™), VoIP softphones (e.g., Avaya Inc.'s IP Softphone™), Personal Digital Assistants or PDAs, instant messaging devices, Personal Computers, laptop computers, and the like. Examples of suitable devices are the 30000™, 4610SW™, and 20002™ IP telephones of Avaya, Inc. While the device 300 is external or internal to the enterprise network 308, the devices 332a-n are internal. An "external" communication device is not controlled by the switch/server 320 (e.g., does not have an extension serviced by the switch/server 320) while an "internal" device is controlled by the switch/server 320.

The gateway 304 can be any suitable NAT gateway, whether employing NAPT or basic NAT, and includes a NAT module 344 to convert a set of internal addresses to one or more external addresses, a NAT protocol stack 348 for presentation to devices (not shown) on the untrusted distributed processing network, and a number of external ports 352a-m for sending packets to and receiving packets from the network 312.

The untrusted network 312 can be any partitioned data and/or distributed processing network, such as an intranetwork or an internetwork (e.g., the Internet). The network 312 typically includes additional proxy servers (not shown), registrars (not shown), gateways (not shown), and routers (not shown) for managing packet flows.

The security gateway 316 provides signal control and conversion capabilities between the untrusted network 312 and the trusted network 340. The gateway is positioned logically between the trusted network 340 and the other elements of the enterprise network 308 on the one hand and the untrusted network 110 on the other to process communications passing between the appropriate switch/server and the second network. Any suitable gateway providing a secure boundary between the enterprise network 308 and the network 312 may be used. The security gateway 316 typically includes a secured communication client, such as an IPSec client, and can include a NAT module. For example, exemplary gateways include Avaya Inc.'s, G700™, G650™, G600™, MCC/SCC™ media gateways.

The switch/server 320 directs communications, such as incoming Voice Over IP or VoIP calls, in the enterprise network 308. The terms "switch", "server", and "switch and/or server" as used herein should be understood to include a PBX, an ACD, an enterprise switch, an enterprise server, or other type of telecommunications system switch or server, as well as other types of processor-based communication control devices such as media servers, computers, adjuncts, etc. The switch/(media) server can be any architecture for directing contacts to one or more communication devices. Illustratively, the switch/server 320 of FIG. 3 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; and/or Avaya Inc.'s DEFINITY™, COMMUNICATION MANAGER™, or MULTI-VANTAGE™ private-branch exchange (PBX)-based ACD system. The switch/servers 320 typically is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch/server comprises a network interface card to provide services to the associated communication devices 332a-n.

The TFTP server 334 effects file transfers. The TFTP server can upload/download files, such as executable images and configuration information, to routers, switches, communication devices, and other components.

The address translator and/or resolver 328 can be any server that translates or resolves a name or identifier into a corresponding address or translates an address from one form to another form. In a preferred embodiment, the translator and/or resolver 328 is a domain name server that is authoritative for a corresponding domain or subdomain within the enterprise network 308 and/or a proxy server, such as a core or authoritative proxy server, that is authoritative for all or a portion of the enterprise network. As will be appreciated, a domain will typically include one or more subdomains (not shown), each of which is serviced by one or more (sub) domain name servers that are authoritative for the subdomain, and the core proxy server performs name resolution and is authoritative for the enterprise network. The proxy server may be configured for the Session Initiation Protocol or SIP or any other telecommunications protocol such as H.323 and the like. The proxy server performs contact list resolution under SIP.

The domain name server acts as both a resolver and domain name server. It answers name resolution queries for which it is authoritative and attempts to resolve or query other name servers about information regarding domains for which it is not authoritative. The server 328 is able to handle both recursive and iterative name resolution queries. As will be appreciated in recursive queries, the name server follows successive referrals until the requested information is found and, in iterative queries, the queried name server must return the requested information or the name of a name server that can in turn be queried for the requested information. In one configuration, the switch/server 320 and the communication devices each have a host/IP address within the domain/subdomain.

The other servers 336 can include a variety of types of servers. One exemplary type of server includes a presence server.

The gateway 304, security gateway 316, communication devices 308a-n, switch/server 320, TFTP server 324, address translator and/or resolver 328, and other servers 336 are conventional.

According to an embodiment of the present invention, the communication device 300 includes a secured communication client 346, such as an IPSec client, to setup and administer the secure tunnel with the security gateway 316, a discovery agent 348 to determine the encapsulation method and effect configuration of the communication device 300 to use the proper encapsulation method, a VoIP communication application 352 to effect packet-switched voice communications with another VoIP communication device, such as communication devices 332a-n, a native (e.g., IPSec) protocol stack 356 to process packetized communications, and a plurality of transmit and receive ports 360a-m for transmitting and receiving packets.

Before discussing the operation of the discovery agent 348, it is important to understand the problem addressed by the agent 348. The problem arises from the fact that the NAT gateway 304 will transmit successfully packets having certain tunneling encapsulation modalities while transmitting unsuccessfully packets having other tunneling encapsulation modalities. This problem is complicated further by the fact that each encapsulation method has a different impact on the IP bandwidth used by the encoded voice packets. Although the discovery agent 348 is discussed with reference to the IP Security ("IPSec") suite of protocols, it is to be understood that the discovery agent 348 can be used with other VPN protocols, such as the Point-to-Point Tunneling Protocol, Layer 2 Forward Protocol, Layer 2 Tunneling Protocol, and SOCK.Sv.5. As will be appreciated, the IPSec suite of protocols includes an authentication header, an Encapsulating Security Payload (ESP), and an Internet Key Exchange (IKE). Operating at layer 3, IPSec provides address authentication via the authentication header, data encryption via ESP, and automated key exchanges between the sender and receiver nodes using IKE.

Figure 2:
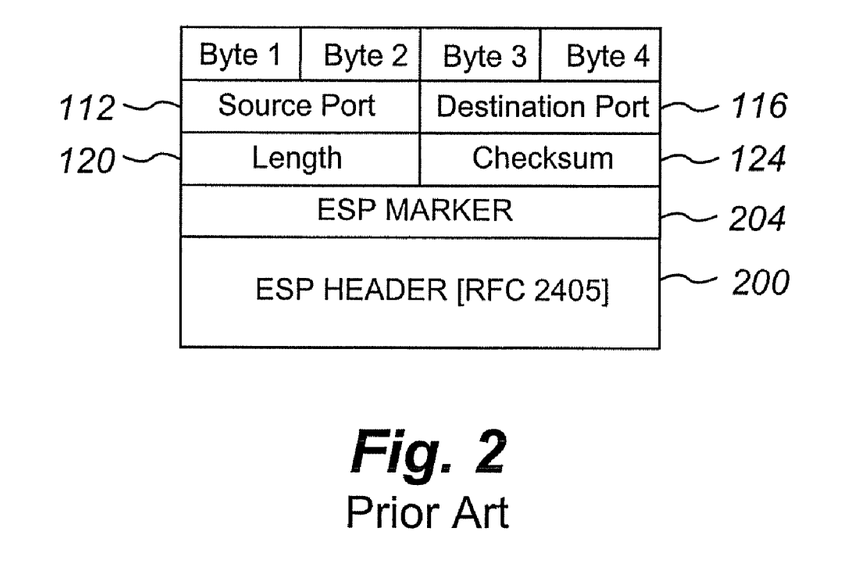
FIG. 2 shows a prior art packet header according to a second encapsulation method.

With reference to FIG. 2, User Datagram Protocol (UDP) encapsulated IPSec packets are sent and received on the same port as Internet Key Exchange (IKE) protocol packets; that is, both types of packets are received on UDP Port 500. To distinguish between IPsec and IKE packets received on the same port, first and second non-IKE markers 100 and 104 are used in the packet header 108. Other fields in the header 108 include source port 112, destination port 116, payload length 120, and checksum 124. When both the first and second non-IKE markers 100 and 104 are set to zero or a null value, the packet is treated as a UDP Encapsulated IPSec packet and is consumed by the IPSec stack 356. Otherwise, the packet is treated as an IKE packet. IPSec aware NAT devices will discard this packet when the first and second non-IKE markers 100 and 104 are zero, because the first and second non-IKE markers 100 and 104 correspond to the initiator and responder cookie of the IKE packet, which cannot be zero. When the NAT Device is not IPSec aware, the first and second non-IKE markers can be used successfully to determine the treatment of the packet.

By way of further illustration and with reference to FIG. 2, UDP encapsulated IPSec packets are sent and received on the same port as IKE packets but on port 4500 instead of UDP port 500. To distinguish between IPsec and IKE packets received on the same port, a non-Encapsulated Security Payload or ESP marker 204 in front of the ESP header 200 is used to indicate IKE packets. Such a packet will pass through an IPSec aware NAT device unhindered.

In VoIP communications, voice data is sent to a destination device using the Real-Time Transport Protocol or RTP, which operates over UDP. A Transport Control Protocol or TCP connection between the two VoIP communication devices is used to setup and tear down calls, to negotiate capabilities, and to setup the RTP channel, which is then used to transmit packetized voice data. One VoIP Call uses two RTP streams, one stream is for incoming voice data and the other stream for outgoing voice data.

The table below shows the IP bandwidth in Kbps required for the two most common codecs and the MOS (Mean opinion score) of each codec.

TABLE 1

| Codec | Packet Duration | IP Bandwidth | MOS |
|---|---|---|---|
| G.711 | 20 ms | 80 Kbps | 4.1 |
| G.711 | 30 ms | 75 Kbps | 4.1 |
| G.729 | 20 ms | 24 Kbps | 3.9 |
| G.729 | 30 ms | 19 Kbps | 3.9 |

As will be appreciated, a codec configured with a higher packet duration is more sensitive to packet loss and jitter than a codec configured with a lower packet duration. MOS degrades rapidly for a 30 ms packet duration in comparison to a 20 ms packet duration under moderate packet losses.

Table 2 below shows the number of calls that can be carried on the most widely used Wide Area Network links for VoIP calls using different codecs and a fixed packetization delay of 20 ms.

TABLE 2

| Codec | Connection Speed | IP Bandwidth for 1 call. | Number Of Calls |
|---|---|---|---|
| G.711 | 1.536 Mbps DS1/T1 | 160 Kbps | 9 |
| G.711 | 44.736 Mbps DS3/T3 | 160 Kbps | 286 |
| G.729 | 1.536 Mbps DS1/T1 | 48 Kbps | 32 |
| G.729 | 44.736 Mbps DS3/T3 | 48 Kbps | 954 |

Figure 1:
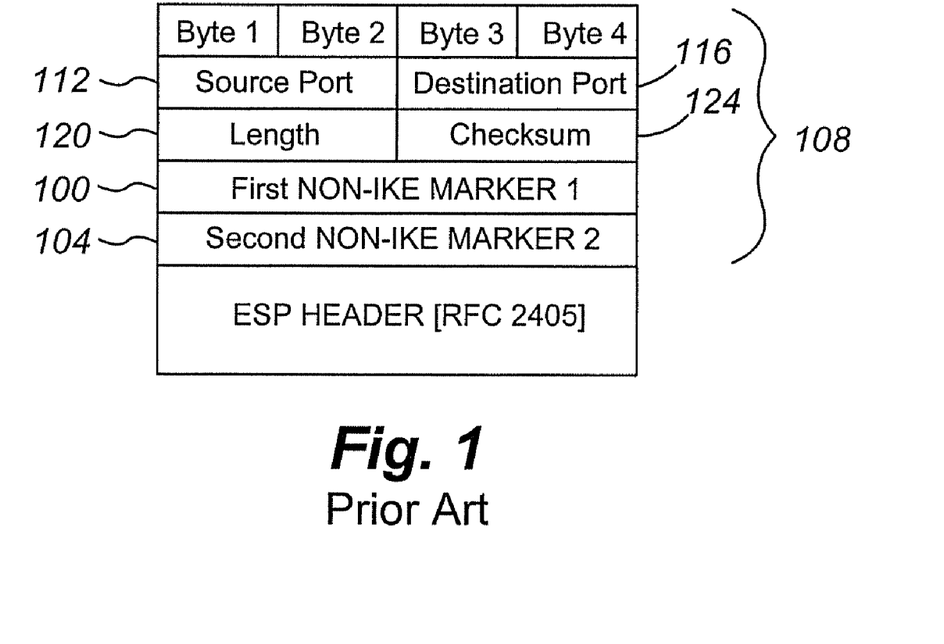
FIG. 1 shows a prior art packet header according to a first encapsulation method.

When IPSec is employed without UDP encapsulation to provide a secure tunnel for VoIP communications, it increases the packet size of an RTP stream by adding the ESP Header 200, padding, authentication payload, and a new IP header 108. Without any UDP encapsulation, the additional packet overhead includes, in order of appearance, the first (unencrypted) IP header (20 bytes) (not shown), the ESP header 200 (36 bytes (Triple Data Encryption Standard padding with a hash value (e.g., a Secure Hash Algorithm digest))), the second (encrypted) IP header (20 bytes) (not shown), the UDP header (8 bytes) (not shown), and the RTP header (12 bytes) (not shown). Table 3 shows the bandwidth required for one RTP stream without UDP encapsulation.

TABLE 3

| Codec | Packet Duration | IP Bandwidth |
|---|---|---|
| G.711 | 20 ms | 101 Kbps |
| G.711 | 30 ms | 89 Kbps |
| G.729 | 20 ms | 45 Kbps |
| G.729 | 30 ms | 33 Kbps |

Table 4 shows the number of VoIP calls that can be carried, when IPSec is used without UDP encapsulation, on most widely used WAN links assuming a fixed packetization delay of 20 ms.

TABLE 4

| Codec | Connection Speed | IP Bandwidth for 1 call | Number Of Calls |
|---|---|---|---|
| G.711 | 1.536 Mbps DS1/T1 | 202 Kbps | 7 |
| G.711 | 44.736 Mbps DS3/T3 | 202 Kbps | 226 |
| G.729 | 1.536 Mbps DS1/T1 | 90 Kbps | 17 |
| G.729 | 44.736 Mbps DS3/T3 | 90 Kbps | 508 |

When IPSec is employed with UDP encapsulation and a first and second IKE markers to provide a secure tunnel for VoIP communications, it increases the packet size of an RTP stream. The additional packet overhead includes, in order of appearance, the first (unencrypted) IP header (20 bytes), the first UDP header (8 bytes), the first and second IKE markers 100 and 104 (8 bytes), the ESP header 200 (36 bytes (Triple Data Encryption Standard padding with a hash value (e.g., a Secure Hash Algorithm digest))), the second (encrypted) IP header (20 bytes) (not shown), the second UDP header (8 bytes) (not shown), and the RTP header (12 bytes) (not shown). Table 5 shows the bandwidth required for one RTP stream with UDP encapsulation using a non-IKE marker.

TABLE 5

| Codec | Packet Duration | IP Bandwidth |
|---|---|---|
| G.711 | 20 ms | 108 Kbps |
| G.711 | 30 ms | 93 Kbps |
| G.729 | 20 ms | 52 Kbps |
| G.729 | 30 ms | 37 Kbps |

Table 6 shows the number of VoIP calls that can be carried, when UDP encapsulated IPSec and the first and second non-IKE markers are used, on most widely used WAN links assuming a fixed packetization delay of 20 ms.

TABLE 6

| Codec | Connection Speed | IP Bandwidth for 1 call. | Number Of Calls |
|---|---|---|---|
| G.711 | 1.536 Mbps DS1/T1 | 216 Kbps | 7 |
| G.711 | 44.736 Mbps DS3/T3 | 216 Kbps | 212 |
| G.729 | 1.536 Mbps DS1/T1 | 104 Kbps | 15 |
| G.729 | 44.736 Mbps DS3/T3 | 104 Kbps | 440 |

When IPSec is employed with UDP encapsulation and a non-ESP marker to provide a secure tunnel for VoIP communications, it further increases the packet size of an RTP stream. The additional packet overhead includes, in order of appearance, the first (unencrypted) IP header (20 bytes), the first UDP header (8 bytes), the ESP header 200 (36 bytes (Triple Data Encryption Standard padding with a hash value (e.g., a Secure Hash Algorithm digest))), the second (encrypted) IP header (20 bytes) (not shown), the second UDP header (8 bytes) (not shown), and the RTP header (12 bytes) (not shown). Table 7 shows the bandwidth required for one RTP stream with UDP encapsulation using a non-IKE marker.

TABLE 7

| Codec | Packet Duration | IP Bandwidth |
|---|---|---|
| G.711 | 20 ms | 105 Kbps |
| G.711 | 30 ms | 91 Kbps |
| G.729 | 20 ms | 49 Kbps |
| G.729 | 30 ms | 35 Kbps |

Table 8 shows the number of VoIP calls that can be carried, when UDP encapsulated IPSec and a non-ESP marker are used, on most widely used WAN links.

TABLE 8

| Codec | Connection Speed | IP Bandwidth for 1 call. | Number Of Calls |
|---|---|---|---|
| G.711 | 1.536 Mbps DS1/T1 | 210 Kbps | 7 |
| G.711 | 44.736 Mbps DS3/T3 | 210 Kbps | 218 |
| G.729 | 1.536 Mbps DS1/T1 | 98 Kbps | 16 |
| G.729 | 44.736 Mbps DS3/T3 | 98 Kbps | 467 |

The comparative bandwidth utilizations of the various encapsulation methods are shown in Table 9. The table below shows the bandwidth required to support 100 concurrent calls using a G.711 Codec and packetization delay of 20 ms with the various IPSec encapsulation schemes.

TABLE 9

| Encapsulation | Bandwidth required to support 1000 Calls |
|---|---|
| IPSec Only | 202 * 1000 = 198 Mbps |
| UDP Encapsulated IPSec with first and second IKE markers | 216 * 1000 = 211 Mbps |

TABLE 9-continued

| Encapsulation | Bandwidth required to support 1000 Calls |
|---|---|
| UDP Encapsulated IPSec with non-ESP marker. | 210 * 1000 = 206 Mbps |

Table 10 below shows the bandwidth required to support 100 concurrent calls using a G.729 Codec and packetization delay of 20 ms with the various IPSec encapsulation schemes.

TABLE 10

| Encapsulation | Bandwidth required to support 1000 Calls |
|---|---|
| IPSec Only | 90 * 1000 = 88 Mbps |
| UDP Encapsulated IPSec with first and second IKE markers | 104 * 1000 = 102 Mbps |
| UDP Encapsulated IPSec with non-ESP marker. | 98 * 1000 = 96 Mbps |

As can be seen from the above discussion, IPSec-aware NAT devices allow the IPSec traffic to pass through even though it is not UDP encapsulated, provided that there is only one secured communication (e.g., IPSec) client connected to the same security gateway. As shown above, an IPSec-aware NAT device can help in reducing dramatically bandwidth requirements by eliminating the need for encapsulation. The determination whether the gateway 304 is IPSec-aware is far from being straightforward. In most implementations, the administrator either enables or disables IKE NAT-T traversal by default, and the end user of the IPSec client software is left with the responsibility to sort any issues arising from the location of the NAT device in front of the secured communication client 346.

Figure 4:
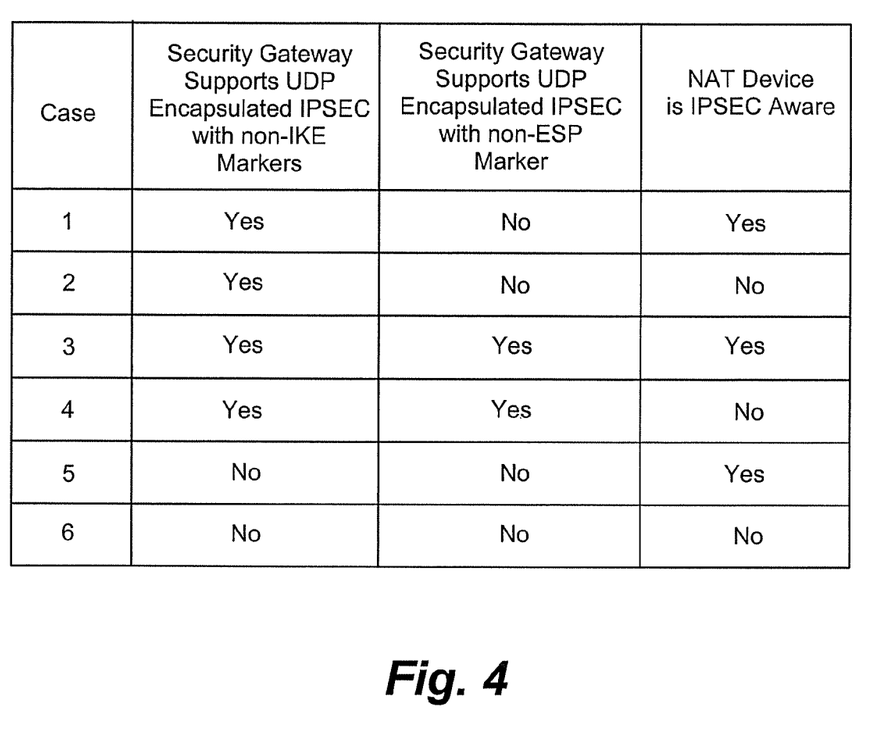
FIG. 4 is a table depicting various possible encapsulation methods.

The complexity of the determination whether or not the gateway 304 is IPSec-aware is shown in FIG. 4. FIG. 4 shows all of the possible permutations that a secured communication client 346 can encounter when placed behind a NAT device, such as gateway 304. To reduce maximally bandwidth utilization, UDP encapsulation of IPSec packets should be disabled for cases 1, 3, and 5. For case 2, UDP Encapsulation of IPSec packets must be enabled with the first and second IKE markers 100 and 104 and, for case 4, UDP Encapsulation of IPSec packets with a non-ESP marker can be negotiated because the security gateway can support both UDP Encapsulation of IPSec packets with the first and second IKE markers or with a non-ESP marker. In case 6, the secured communication client 346 will not work. Cases 1 and 2 are special in that the secured communication client 346 will not work, if NAT traversal is disabled by the administrator in case 2 or if NAT traversal is enabled by administrator in case 1.

The discovery agent 348 determines automatically (without user input) which of the six cases is in effect and selects the encapsulation method to be employed to reduce, to the maximum extent possible, bandwidth requirements for secured VoIP communications. Once the encapsulation method is determined, the agent 348 preferably performs one of the following operations:

1. Makes the secured communication client 346 work without user intervention in case 1, when IKE NAT traversal is enabled by administrator.
2. Makes the secured communication client 346 work without user intervention in cases 2 and 4, when IKE NAT traversal is disabled by administrator to maximize substantially bandwidth utilization.

The usability of the tunnel for VOW communications requires the agent 348 to discover the particular encapsulation method already negotiated or to be negotiated between the NAT gateway 304 and the security gateway 316. To determine the particular encapsulation method already in use or to be used for the tunnel, the agent 348 generates and transmits via the tunnel packets having a selected encapsulation method and then listens on a selected transmit port 360a-m for a response. The packet payloads are arbitrary and are selected to elicit a response from a component in the enterprise network 308. When a response is received on the selected receive port 360a-m, it is known that the particular encapsulation method and transmit port selected are correct for the tunnel.

For this detection process to be successful, the security gateway should be configured to meet at least one of the requirements listed below.

1. Secured communication clients are able to send packets to and receive packets from themselves.
2. The security gateway 316 is able to provide the capability to resolve names through the secure communications tunnel.
3. The security gateway 316 allows requests, such as ICMP Echo and polling requests, and/or pings and reply messages between the secured communication client and hosts on the private side (or trusted network side) of the security gateway 316.

There are at least three methods generally used to determine the usability of the tunnel for VoIP communications. In each method, usability is determined by sending predetermined types of packets over the tunnel at periodic intervals while listening, for an ensuing selected time interval, at selected ports 360a-m for an increment in a received packet counters. As will be appreciated, an increment in a received packet counter indicates that a response has been received. Stated another way, each method attempts to communicate with the inside (clear text) interface of the security gateway 316 and elicit a response. When a response is received, the selected combination of encapsulation method and receive port 360a-m is known to be correct.

In the first method, a packet having an arbitrary payload is sourced from and destined to the communication device 300 or a component thereof (such as the secured communication client). The packet is inserted directly in the tunnel so that it bypasses the normal native protocol stack 356. If the packet is passed through the native protocol stack, the packet will not be transmitted. Such a packet will get routed back to the secured communication client 346 resulting in an increase in received packet counters, when the security gateway 316 meets the first configuration requirement listed above. To be able to route the packet back to the communication device 300, the security gateway 316 must be able to decrypt the packet or place the packet on the clear text side of the gateway 316. Effectively, the IP address of the communication device, or a component thereof, is used as a test parameter of the selected encapsulation method in effect for the tunnel.

In the second method, arbitrary messages are sent to a selected computational component in the enterprise network 308. In one variation, a name translation or resolution query for a predefined (arbitrary) string (e.g., "VPNPHONE") to the translator and/or resolver 328 (e.g., DNS server or a proxy server) is sent via the tunnel when the security gateway 316 configuration supports name translation and/or resolution through the tunnel. Such a packet will get a negative response from the translator and/or resolver 328 resulting in an increase in received packet counters. Alternatively, the name provided in the query could be a correct name to which the translator and/or resolver 328 provides a correct equivalent in the response. In another variation, a ping message, such as an Internet Control Message Protocol or ICMP request, is sent to a selected component, such as the TFTP server 324, switch/server 320, and the like, using different encapsulation methods and transmit and receive port 360*a-m* combinations until a response is received. The key in the variations is that the security gateway 316 must be able to decrypt the packet properly for it to be forwarded to the translator and/or resolver 328 and a response to be received. Thus, the encapsulation method selected is known to be correct when a response is received, regardless of the content of the response.

In the third method, a ping, such as a traceroute packet, is sourced from IPsec client's virtual IP and destined to X, where X is the IP address of a host needed by the application requiring secured communication client services. If such an arrangement is not viable, X is selected to be one or more of a randomly selected IP address near the communication device 300 (e.g., the last octet of the address is changed), on another subnet in the enterprise network 308, or somewhere else in the enterprise network 308. In one configuration, X is set to a selected value (e.g., 10.200.200.200), when the arrangement is not viable. As will be appreciated, a traceroute message is processed by routers and shows every hop between a specified pair of addresses. Thus, the randomly selected addresses need to correspond to a router for a traceroute request to be successful (e.g., elicit a response). In this case, one of the addresses is the address of the communication device 300 and the other address is X. In this case if security gateway 316 configuration cannot meet configuration requirements (1) or (2) listed above, administrators should setup a host with selected value (e.g., 10.200.200.200) for an IP address if one does not already exist on the private side of the security gateway 316.

As noted, this agent 348 does not require a positive response for the request. When the received packet counter does not increment within a preconfigured time limit, the tunnel is considered unusable, and tunnel is rebuilt either (a) with IKE NAT traversal disabled, if the initial tunnel was setup with IKE NAT traversal enabled or (b) with IKE NAT traversal enabled, if the initial tunnel was setup with IKE NAT traversal disabled.

Figure 5:
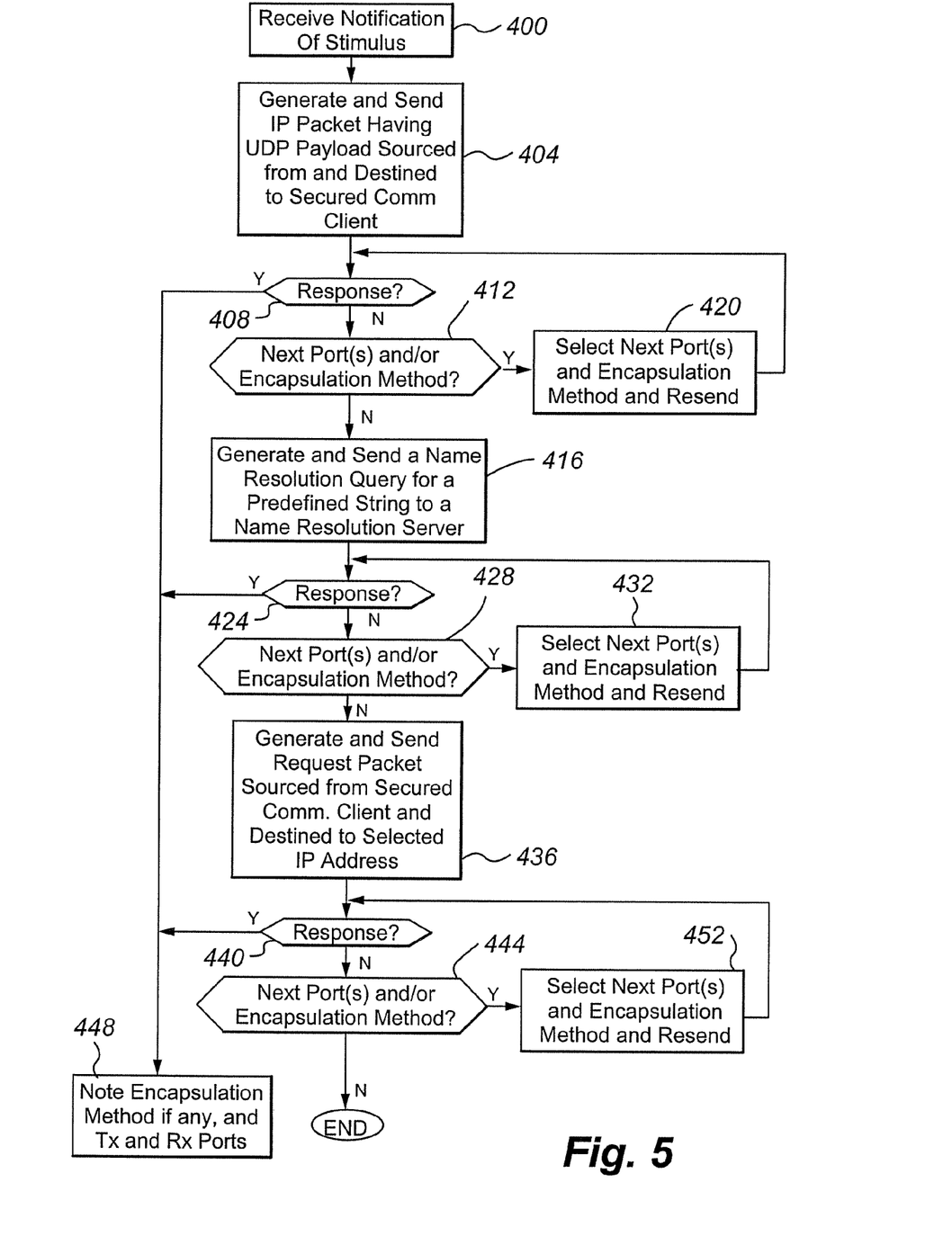
FIG. 5 is a flow schematic depicting the operation of the discovery agent according to an embodiment of the present invention.

The operation of the agent 348 will now be discussed with reference to FIGS. 3 and 5.

The stimulus in step 400 for invocation of the agent 348 is powering up the communication device 300, a link going down, or tearing down of an existing tunnel. In any of the cases, a new tunnel needs to be established.

In step 404, the agent 348 generates and sends an IP packet having UDP payload and encapsulated by one of the methods described in FIG. 4 is sourced from and destined to the communication device 300, or a component thereof such as the secured communications client 346. The IP packet is transmitted on a selected transmit port 360*a-m*. This step uses the first method described above.

In decision diamond 408, the agent 348 determines if a response has been received on a selected receive port 360*a-m*. When no response is received, the agent 348, in decision diamond 412 determines whether, for the current encapsulation method, any possible transmit and receive ports 360*a-m* remains to be used and, if not, whether a next encapsulation method remains to be attempted. If so, the agent 348, in step 420, selects the next port pairing and/or encapsulation method, as appropriate, and resends the packet. The agent 348 then returns to and repeats decision diamond 408.

When all transmit and receive port 360*a-m* combinations have been used for each possible encapsulation method, the agent 348 concludes that the communication client 346 is not able to send packets to and receive packets from itself and proceeds to step 416.

In step 416, the agent 348 generates and sends a name resolution query for a predefined string to an address translator and/or resolver 328. The IP packet is encapsulated by one of the methods described in FIG. 4 and is transmitted out on a selected transmit port 360*a-m*. This step uses the second method described above.

In decision diamond 424, the agent 348 determines if a response has been received on a selected receive port 360*a-m*. When no response is received, the agent 348, in decision diamond 428 determines whether, for the current encapsulation method, any possible transmit and receive ports 360*a-m* remains to be used and, if not, whether a next encapsulation method remains to be attempted. If so, the agent 348, in step 432, selects the next port 360*a-m* pairing and/or encapsulation method, as appropriate, and resends the packet. The agent 348 then returns to and repeats decision diamond 416.

When all port transmit and receive combinations have been used for each possible encapsulation method, the agent 348 concludes that the security gateway 316 is unable to provide the capability to resolve names through the secure communications tunnel and proceeds to step 436.

In step 436, the agent 348 generates and sends a request packet sourced from the communication device 300 or a component thereof such as the secured communication client 346 and destined to a selected IP address. The IP packet is encapsulated by one of the methods described in FIG. 4 and is transmitted out on a selected transmit port 360*a-m*. This step uses the third method described above.

In decision diamond 440, the agent 348 determines if a response has been received on a selected receive port 360*a-m*. When no response is received, the agent 348, in decision diamond 444 determines whether, for the current encapsulation method, any possible transmit and receive ports remains to be used and, if not, whether a next encapsulation method remains to be attempted. If so, the agent 348, in step 452, selects the next port pairing and/or encapsulation method, as appropriate, and resends the packet. The agent 348 then returns to and repeats decision diamond 440.

When all port transmit and receive combinations have been used for each possible encapsulation method, the agent 348 concludes that the security gateway 316 does not allow such requests and/or reply messages between the secured communication client 346 and hosts on the private side (or trusted network side) of the security gateway 316, concludes that the tunnel is unusable, effects the creation of a new tunnel as noted above, and terminates operation.

When a response has been received in any of decision diamonds 408, 424, and 448, the agent 348 in step 448, notes the encapsulation method and transmit and receive ports used successfully and terminates operation.

It should be noted that the invention does not require any particular type of information transport medium or protocol between switch/server and stations and/or between the gateways, i.e., the invention may be implemented with any desired type of transport medium as well as combinations of different types of transport media.

A number of variations and modifications of the invention can be used. It would be possible to provide for some features of the invention without providing others.

For example in one alternative embodiment, a fourth method is used to determine the compatibility of the selected encapsulation method and the NAT gateway 304. In the method, an IP packet, containing an arbitrary UDP payload, is sourced from and destined to the secured communication client's virtual IP address. Within each tunnel, a Security Parameters Index (SPI) is created for incoming and outgoing packets. The SPI_IN and SPI_OUT are each assigned a number. As will be appreciated, the SPI is four bytes in length and identifies the security protocols or security association being used in the packet and appears in the authentication and ESP headers. The communication device 300 sends an incorrect number for the SPI on the transmit channel, and the security gateway 316 will respond with an error message. The incorrect SPI for the transmit channel is sent using different encapsulation methods until a return (error) message is received. Because the security gateway 316 must be able to decrypt the packet successfully to know that the SPI_OUT is incorrect, the receipt of a response indicates that the selected encapsulation method is correct. For this method to be successful, the security gateway 316 must be configured respond to an incorrect SPI by sending an error notification.

Figure 6:
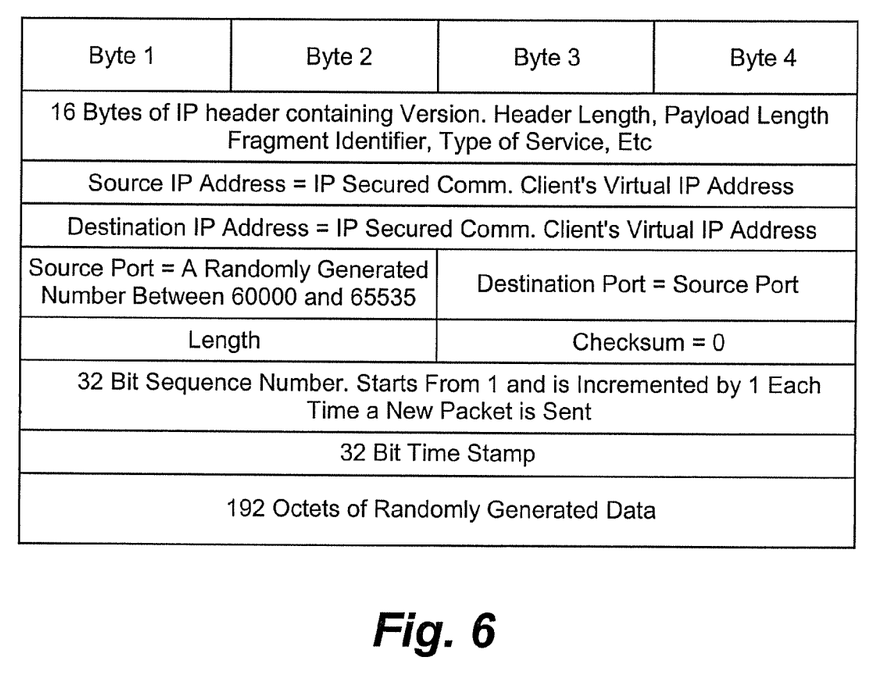
FIG. 6 depicts a packet format according to an embodiment of the present invention.

In another alternative embodiment, detecting tunnel usability for VoIP communications detects whether the tunnel quality is acceptable for VoIP based on latency and packet loss. To determine tunnel usability for VoIP communications in this manner, the security gateway is configured to allow secured communication clients to be able to send and receive packets to themselves. With this requirement in effect, the method involves injecting IP packets, containing UDP payload sourced from and destined to the secured communication client's virtual IP address, directly in the tunnel at a selected (e.g., 20 ms) frequency for a preconfigured duration. The source and destination port in the UDP header is set to some randomly generated number. The size of the UDP payload is set to a selected number of bytes (e.g., 200 bytes) and initialized with some randomly generated byte pattern. The first 4 Bytes of the UDP payload contains the packet sequence number. The next 4 Bytes contains the time stamp at which packet was handed over to secured communication client for injecting into the tunnel. The format of such a packet is shown in FIG. 6. The packets are routed back to the client 346 by the security gateway 316 when the security gateway 316 configuration meets the requirement listed above. Upon receipt of such a packet, the secured communication client 346 can determine the round trip time taken based on time stamp and number of packet(s) lost based on sequence number.

In yet another embodiment, the payload of the packet used to discovery encapsulation method and transmit and receive ports for a tunnel can have a legitimate, nonarbitrary payload. For example, the payload could be voice data, device configuration information, a request for device configuration information, or information associated with registration of the communication device.

In yet another embodiment, only one or two of the three methods may be employed in a selected VPN application.

In yet another embodiment, the agent 348 determines after step 448 whether the discovered encapsulation method in use by the tunnel is optimal, or otherwise acceptable, for VoIP communications. If not, the agent 348 may cause a new tunnel to be established using a more optimal encapsulation method for VoIP communications to conserve bandwidth. In that event, the secured communication clients in the communication device 300 and security gateway 316 negotiate for the new tunnel a more optimal encapsulation method.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. In a Virtual Private Network or VPN comprising a Network Address Translation or NAT device and a voice communication device, a method to determine an encapsulation used by a tunnel, comprising:
a processor selecting a first encapsulation method for use in a pre-existing tunnel;
the processor transmitting a packet encapsulated by the first encapsulation method;
the processor determining if the packet has been received;
the processor determining if a response to the packet has been received;
if either the packet or the response has been received, the processor increasing a receive packet counter;
the processor waiting for a selected period of time;
the processor determining if the receive packet counter has been increased;
if the receive packet counter has not been increased in the selected period of time, the processor selecting a second encapsulation method; and
the processor repeating the transmitting through selecting steps (b) and (c) using the second encapsulation method.

2. The method of claim 1, wherein the step of transmitting a packet encapsulated by the first encapsulation method comprises the substeps:
generating the packet containing an arbitrary payload, wherein the packet is sourced from and destined for a secured communication client; and
introducing the packet directly into the tunnel so that the packet bypasses a native protocol stack.

3. The method of claim 1, wherein the step of transmitting a packet encapsulated by the first encapsulation method comprises the substeps:
generating the packet comprising a name translation and/or resolution query for a predefined string, the packet being addressed to a name translator and/or resolver; and
transmitting the packet via the tunnel to a security gateway positioned between the NAT device and the name translator and/or resolver.

4. The method of claim 1, wherein the step of transmitting a packet encapsulated by the first encapsulation method comprises the substeps:
generating the packet comprising a ping message, the packet being addressed to a selected computational component; and
transmitting the packet via the tunnel to a security gateway positioned between the NAT device and the selected computational component.

5. The method of claim 1, wherein the step of transmitting a packet encapsulated by the first encapsulation method comprises the substeps:
generating the packet, the packet comprising a ping message, wherein the packet is addressed to an address X, where X is one of: (i) an IP address of a known selected host, (ii) a randomly selected address in the same subnet as the communication device, and (iii) a randomly selected address in a subnet different from the subnet of the communication device; and
transmitting the packet via the tunnel to a security gateway positioned logically on the other side of the NAT device from the communication device.

6. The method of claim 1, wherein no response is received when using the first and second encapsulation methods and further comprising:
tearing down the old tunnel; and
building a new tunnel, wherein in the new tunnel one of the following statements is true: (i) when the old tunnel was setup with Internet Key Exchange (IKE) NAT traversal enabled, the IKE NAT traversal in the new tunnel is disabled and (ii) when the old tunnel was setup with IKE NAT traversal disabled, IKE NAT traversal in the new tunnel is enabled.

7. The method of claim 1, wherein the packet contains an arbitrary payload and a value for an identifier associated with the tunnel and wherein the value for the identifier is selected to be incorrect.

8. The method of claim 2, wherein the step of transmitting a packet encapsulated by the first encapsulation method comprises the substeps:
generating the packet comprising a name translation and/or resolution query for a predefined string, the packet being addressed to a name translator and/or resolver; and
transmitting the packet via the tunnel to a security gateway positioned between the NAT device and the name translator and/or resolver.

9. The method of claim 8, wherein the step of transmitting a packet encapsulated by the first encapsulation method comprises the substeps:
generating the packet, the packet comprising a ping message, wherein the packet is addressed to an address X, where X is one of: (i) an internet protocol (IP) address of a known selected host, (ii) a randomly selected address in the same subnet as the communication device, and (iii) a randomly selected address in a subnet different from the subnet of the communication device; and
transmitting the packet via the tunnel to a security gateway positioned logically on the other side of the NAT device from the communication device.

10. The method of claim 1, wherein, when a response is received timely, the selected encapsulation method and transmit and receive ports are in use by the tunnel, wherein, when the selected encapsulation method is unacceptable for voice communications, the existing tunnel is torn down and a new tunnel established, the new tunnel using a different encapsulation method than the existing tunnel.

11. The method of claim 1, wherein the step of transmitting a packet encapsulated by the first encapsulation method comprises the substeps:
periodically introducing the packet into the tunnel at a selected frequency for a predetermined time, wherein the source and destination ports in a packet header are set to a randomly generated number, wherein the packet is sourced from and destined to a secured communication client, wherein the packet header is set to a selected number of bytes and initialized with a randomly generated byte pattern and wherein the packet comprises a timestamp;
when the packet is received by the secured communication client, determining at least one of a round trip time of the packet and a number of packets lost; and
when the at least one of a round trip time and number of packets lost is not acceptable for voice communications, tearing down the tunnel.

12. A tangible, non-transitory computer readable medium comprising processor executable instructions to perform the steps of claim 1.

13. In a Virtual Private Network or VPN comprising a Network Address Translation or NAT device and a voice communication device, a method to determine a tunnel quality, comprising:

a processor periodically introducing a packet into the tunnel at a selected frequency for a predetermined time, wherein the packet is sourced from and destined to a secured communication client of a voice communication device and wherein the packet comprises a timestamp;

when the packet is received by the secured communication client, the processor determining a round trip time of the packet and a number of packets lost; and while the tunnel is functioning and when the round trip time and the number of packets lost is not acceptable for voice communications, the processor tearing down the tunnel.

14. The method of claim 13, wherein the source and destination ports in a packet header of the packet are set to a randomly generated number and wherein the packet header is set to a selected number of bytes and initialized with a randomly generated byte pattern.

15. The method of claim 13, wherein the step of periodically introducing a packet into the tunnel comprises the substeps:

selecting a first encapsulation method;

transmitting a first packet encapsulated by the first encapsulation method on a selected transmit port;

determining, from a receive packet counter associated with a selected receive port, whether the first packet has been received; and when the first packet has not been received within a selected period of time, selecting a second encapsulation method; and repeating the steps of determining a round trip time of the packet and a number of packets lost and while the tunnel is functioning and when the round trip time and the number of packets lost is not acceptable for voice communications, the processor tearing down the tunnel, using the second encapsulation method.

16. A packet-switched voice communication device, comprising:

a secured communication client; and a discovery agent operable to perform the following operations:

select a first encapsulation method;

transmit a packet encapsulated by the first encapsulation method on a selected transmit port;

determine if the packet has been received;

determine if a response to the packet has been received;

if either the packet or the response has been received, increase a receive packet counter;

wait for a selected period of time;

determine if the receive packet counter has been increased;

if the receive packet counter has been increased in the selected period of time, select a second encapsulation method; and repeat the transmit through selected steps using the second encapsulation method.

17. The communication device of claim 16, wherein the packet contains an arbitrary payload and a value for an identifier associated with a tunnel and wherein the value for the identifier is selected to be incorrect.

18. The communication device of claim 16, wherein the transmit operation comprises the sub-operations of:

generating the packet containing an arbitrary payload, wherein the packet is sourced from and destined for a secured communication client; and introducing the packet directly into a tunnel so that the packet bypasses a native protocol stack.

19. The communication device of claim 16, wherein the transmit operation comprises the sub-operations of:

generating the packet comprising a name translation and/or resolution query for a predefined string, the packet being addressed to a name translator and/or resolver; and transmitting the packet via a tunnel to a security gateway positioned between the NAT device and the name translator and/or resolver.

20. The communication device of claim 16, wherein the transmit operation comprises the sub-operations of:

generating the packet comprising a ping message, the packet being addressed to a selected computational component; and transmitting the packet via a tunnel to a security gateway positioned between the NAT device and the selected computational component.

21. The communication device of claim 16, wherein the transmit operation comprises the sub-operations of:

generating the packet, the packet comprising a ping message, wherein the packet is addressed to an address X, where X is one of: (i) an IP address of a known selected host, (ii) a randomly selected address in the same subnet as the communication device, and (iii) a randomly selected address in a subnet different from the subnet of the communication device; and transmitting the packet via a tunnel to a security gateway positioned logically on the other side of the NAT device from the communication device.

22. The communication device of claim 16, wherein, when a response is received timely, the selected encapsulation method and transmit and receive ports are in use by a tunnel.

* * * * *

UNITED STATES PATENT AND TRADEMARK OFFICE
CERTIFICATE OF CORRECTION

| | | |
|---|---|---|
| PATENT NO. | : 8,059,641 B1 | Page 1 of 1 |
| APPLICATION NO. | : 11/458824 | |
| DATED | : November 15, 2011 | |
| INVENTOR(S) | : Anupam Rai | |

It is certified that error appears in the above-identified patent and that said Letters Patent is hereby corrected as shown below:

On the Title page of the Letters Patent under (75) please delete "Milpitas" and replace it with --San Jose-- therein.

At Column 15, line 25, please delete "(b) and (c)" therein.

Signed and Sealed this
Sixth Day of November, 2012

David J. Kappos
*Director of the United States Patent and Trademark Office*